Nov. 27, 1962 M. P. KOERNER ET AL 3,066,065
GLASS FLAKE ELECTRICAL INSULATION
Filed Jan. 30, 1959
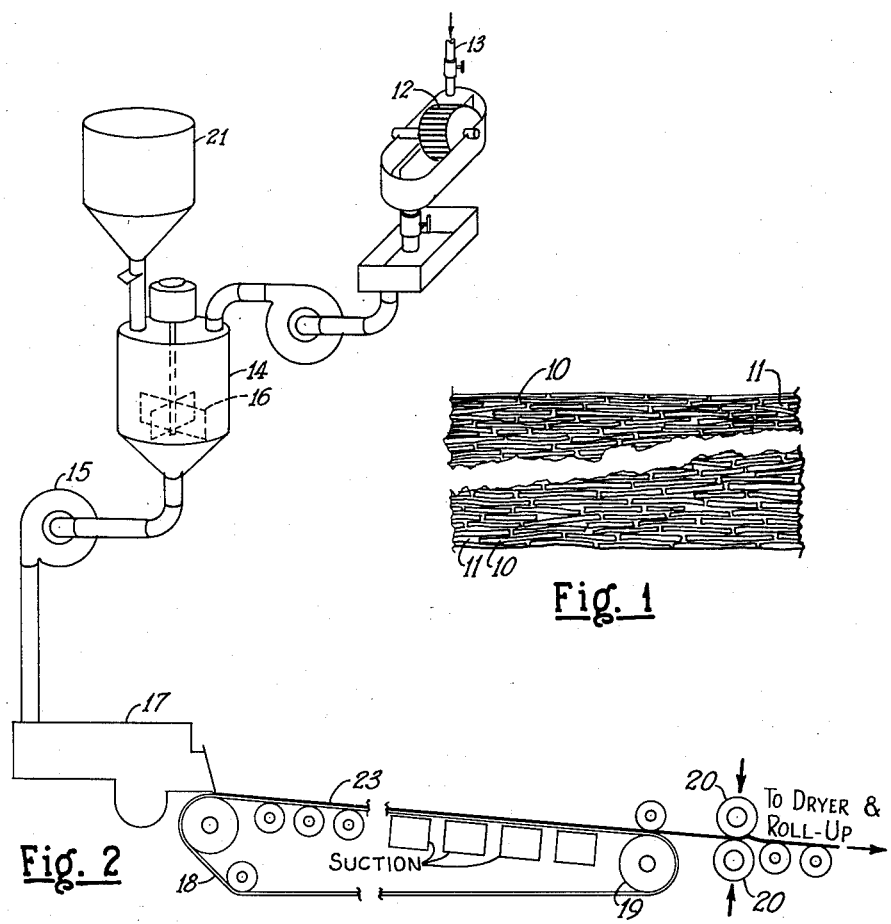
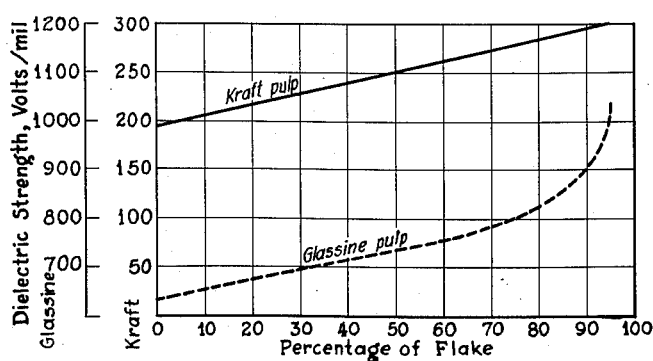
MARK P. KOERNER &
LESLIE L. WARNER
INVENTORS
BY
ATTORNEYS

3,066,065
GLASS FLAKE ELECTRICAL INSULATION
Mark P. Koerner, Valley Falls, and Leslie L. Warner, Saylesville, R.I., assignors to Owens-Corning Fiberglas Corporation, a corporation of Delaware
Filed Jan. 30, 1959, Ser. No. 790,268
8 Claims. (Cl. 162—138)

This invention relates to glass flake products, and more particularly to electrical insulation sheets made of glass flakes bonded by a glassine-type pulp.

Flakes made of glass have a high dielectric strength measured up to 2800 volts per mil. With such high dielectric strength they are especially adapted to imparting dielectric characteristics to paper-like products in which they are incorporated. Due to the geometry of the flakes it is possible to produce a network of platelets similar to that displayed in mica paper or sheets, which act as a dielectric barrier when subjected to a voltage stress.

Flake platelets in thicknesses ranging from .00003 to .0002 inch and having random area dimensions up to ½ inch have proven highly successful for such purposes. An additional characteristic which lends to this success lies in the chemical resistance of the glass as well as the type of binder composition utilized to form these dielectric products.

The ultimate in dielectric sheets of this character are sheets made of 100% glass flakes. To incorporate glass flakes in such an insulating product, however, binding agents are required which, in all instances thus far explored, have a dielectric strength less than that of the flakes themselves. Without such binding agent, however, the flake structure is weak and falls apart with handling. A flake sheet having a large amount of binding agent incorporated for strength, on the other hand, has a lower dielectric strength.

Flake thickness has an effect on the dielectric strength obtainable in a composite to the extent that thickness is a factor in establishing density of the composite. Greater densities have been found to provide higher dielectric strengths. By way of example of the physical assembly of such composites, a 4 mil sheet may contain a maximum of twenty layers of .0002 inch thick flake, fifty layers of .00008 inch flake or 130 layers of .00003 inch flake. It has been found that with a larger number of layers, a more dense composite structure can be formed with the proper binding media.

When the binding media is a pulp, it has been found that the dielectric strength is best when the pulp freeness is the least. Although flake thickness is an important factor in determining dielectric strength, pulp freeness is at the least equally important as a determinant. It is believed that this is true because the density of the sheets in controlled to a great extent by the fineness and degree of adhesivity of the bonding media.

According to this invention, the bonding medium is a glassine type pulp, which tests reveal has a high adhesive affinity for the glass flake surfaces and has characteristics of high dielectric strength in combination therewith by reason of the fact that the thickness of glassine required between the individual flakes is of such fine dimension that the composite can be densified to a much greater degree than with other adhesives or cellulosic fibers of coarser character.

The bonding medium termed glassine in the present invention is a bleached sulfite pulp beaten by conventional paper-processing methods beyond the usual commercial freeness to a stage where the pulp acquires the properties of a cement-like material. The medium thus produced is a highly hydrated slow dewatering pulp of extremely low freeness. In another sense the glassine pulp in the present instance is classifiable as completely hydrated pulp, rather than a pulp which tends to bundle. The mucilaginous nature of the glassine-type agent incorporated in the present product makes it of character which does not lend itself to manufacture of sheets on screen-type paper making equipment. By incorporation of glass platelets or flakes therein according to the present invention, however, it has been found that screen-type paper making equipment can be utilized to form the insulation sheets comprising the invention with a gratifyingly strong wet web resulting during the forming process.

Sheets constructed of 90% glass flake combined with 10% glassine grade pulp have exhibited dielectric strengths of at least three times greater than similar constructions using ordinary kraft-type pulps. This is attributed to the superior bond offered by the glassine and the fineness of the glassine fibers which enable the platelet structure to be compressed to greater densities where the separation between flakes is practically a minimum. It is further believed that the completely hydrated or gel-like character of the glassine-type pulp is so fine as to actually effect a chemical bond with the glass flake surfaces. The tight bonding between the platelets and the glassine material is evidenced in the final product in its not having tendencies toward flaking.

With regard to the bonding of the platelets, it is interesting to note that the sheets constructed of 95% glass flake combined with 5% glassine pulp offer greater tensile strength than is attainable with 50% kraft or rag pulp. With glassine as the bonding agent, the sheet can be made to include as much as 98% flakes. With less than 70% flakes, however, difficulty is presented in sheet formation because of the larger amount of glassine present.

The forces by which the binder pulp fibers integrate with the glass flake surfaces appear to be much greater than that which would result from mere interentanglement of pulp fibers with the flakes. In addition, the coverage of the glass flake surfaces with what appears almost as a monomolecular layer of the pulp fibers substantiates the concept that the glassine-type pulp fibers established a physical-chemical attachment with the glass flake surfaces. Such combination of the flakes with a small amount of glassine establishes the desired tight relationship with a minimum of material interspersed between the flakes, which has been found conducive to imparting the high dielectric strength desired of the composite form thus produced.

It is an object of this invention to produce a flake glass structure similar to mica forms which has a high dielectric strength and is flexible and has adaptability as an electrical insulation sheet having properties of uniform character and which are reproducible with any of a predeterminable range of dielectric strengths and physical properties.

Another object of this invention is to produce a glass flake structure in combination with a high dielectric binder having a degree of adhesivity that permits minimization of the amount of binding agent required in the composite structure.

Another object of the invention is to produce a glass flake product in which the flakes are integrated by a binding agent of such fineness that it bonds with a minimum detraction from the properties of the flake with regard to high dielectric strength.

A still further object is to produce a glass flake product of the type described in which the binding agent operates flexibly to space the flakes from one another to increase flexibility and reduce the possibility of self-destruction by a mutual abrasion of the flakes.

A still further object is to produce a glass flake product of the type described in which the binding agent consists chiefly of a fibrous material which is present in such small quantities to permit the product to retain practically all of the original characteristics of the glass flakes, such as high heat resistance, flame-proofness, resistance to exposure at high temperature, while at the same time retaining high dielectric strength properties characteristic of the glass flakes in their individual form.

Other objects and features which we believe to be characteristic of our invention are set forth with particularity in the appended claims. Our invention itself, however, both in organization and manner of construction, together with further objects and advantages thereof may be best understood by reference to the following description taken in connection with the accompanying drawings in which:

FIGURE 1 is a cross-sectional view of a glass flake sheet bonded together by glassine-type bonding agent according to the principles of the present invention;

FIGURE 2 is a schematic view of a process for producing glass flake sheets of high dielectric strength in accordance with the principles of this invention; and FIGURE 3 is a graphic representation of the variation in dielectric strength of a glass flake sheet with various percentages of flakes bonded by glassine as compared to a similar product bonded by kraft pulp.

Glass flakes of the composite structure of the present invention are of a type which can be produced by processes such as those disclosed in U.S. Patent 2,457,785, issued to Slayter and Snow on December 28, 1948, or U.S. Patent 2,780,889, issued to Fulk on February 12, 1957. A small percentage, approximately ½ of 1%, of a parting material such as calcium carbonate may be added to decrease the inherent attraction between the flakes. Alternately, a surface acting coupling agent might also be applied if desired to the nascent glass surfaces during the forming operation. The flakes are random in size, approximately ½ inch in maximum dimension with a thickness ranging from .00003 inch to .0002 inch. The glass flakes are produced in general by drawing molten glass at high speeds into an extremely thin sheet. As the sheet moves away from the zone of formation it is broken up into the small flakes which are collected on a conveyor. The random flakes which are thus produced can be used in their original form or can be further treated such as by further breaking up into a hammermilling operation to produce finer platelet particles.

An example of a glass composition from which the flakes can be made for the present purposes is the following:

| | Percent |
|---|---|
| Silicon dioxide | 54 |
| Calcium oxide | 16 |
| Aluminum oxide | 16 |
| Boron oxide | 10 |
| Sodium and potassium oxide | 4 |

Glass flakes of the above composition have a high moisture resistance and chemical stability. Their density is 2.549 and hardness is from 6 to 7 on the Moh scale. Their dielectric strength is up to 2800 volts per mil, while the dielectric constant is 6.43 at 100 cycles and 6.11 at 1 megacycle. Their tensile strength is approximately 100,000 p.s.i. and their modulus of elasticity is $10.5 \times 10^6$ p.s.i.

As indicated above, the binding agent for the glass flakes in the electrical insulation of the present invention is a glassine-type pulp binder which when combined with the glass flakes, offer greater dielectric and physical strengths than heretofore available with other binding agents in combination with the flakes. The glassine-type bonding agent is a glassine grade pulp, such as for example Iggesund, bleached sulfite Mitscherlich type pulp, which as here used is highly beaten to a degree beyond the usual commercial degree of beating to produce glassine products. Due to the high consistency or mucilaginous character of the slurry, Williams precision freeness tests are not practicable because of the slower draining rate of the highly beaten slurry. Beater times are thus used as a basis for comparison. Results indicate that such pulp beaten for four hours in a one pound Valley beater exhibits superior dielectric and physical properties. This degree of beating results in a highly hydrated fiber cellulose with what appears to be a maximum number of hydroxyl groups for bonding to the glass surface. This is a degree of beating much in excess of 600 seconds per 3 gram sample at 25° C. on the Williams precision freeness tester which corresponds to less than 20 cc. on the Canadian freeness tester. Glassine pulp so beaten is a gelatinous mucilaginous mass not readily adapted to fabrication into sheets on commercial screen-type paper-forming equipment, but by the addition of glass flakes in accordance with the present invention, such fabrication into sheets is possible.

The product produced according to this invention is illustrated generally in FIGURE 1 wherein the glass flakes 10 are bonded together by a glassine-type pulp binder 11.

As shown in FIGURE 2, the cellulosic fibers of the type employed are reduced to small dimension in a pulper or beater 12. The dry pulp is fed to the pulper and is reduced to a slurry therein by mixture with water admitted through an inlet 13. The slurry is advanced to a stock chest 14 into which the glass flakes 10 are fed in the desired proportion along with additional water. The mass is thereupon thoroughly mixed by a suitable agitating means such as an impeller 16 associated with the chest. From the stock chest 14 the slurry is pumped by a pump 15 into a head box 17 which effects formation of a sheet on a fourdrinier type screen 18 while separating a major portion of the moisture from the mixture. The formed sheet 23 is passed to a suction couch roll 19 and then through wet press rolls 20 whereupon it is conveyed to a drying section (not shown) for the purpose of eliminating a major portion of the remaining moisture.

Tests have indicated that regardless of the type of pulp or beater time, that .00008 inch flake offers the greatest tensile strength properties to the structure. Thinner flakes increase drainage times substantially and also have greater tendencies toward clogging during the sheet forming operations. The drainage time rapidly increases to twice that for .00008 inch flakes as thickness decreases. Flakes of thicker dimension result in sheets of lesser dielectric strength as well as lesser tensile strength of the composite product formed.

Dielectric strength properties of the glassine-pulp-bonded glass flake particles is shown in FIGURE 3 in comparison to the dielectric strength of a similar composite structure of glass flakes and kraft pulp. This illustrates that as the flake percentages increase, the dielectric strength increases in a glassine pulp composite, and even more so in the higher percentages of glass flakes, than when the kraft pulp bonding agent is utilized. A different scale is used to illustrate the curve for the glassine pulp than for the kraft in view of the much greater value of the dielectric strength for the glassine pulp bonded composite. The increase in this dielectric strength is attributed to the superior bond offered by the glassine which enables the composite to be compressed to a much greater density incorporating a larger percentage of the flake per unit of volume.

Further characteristics of the glass flake—glassine pulp sheets are illustrated in the table below, including the tensile strength and tear strengths of the sheets for various percentages of flake in combination with the glassine.

| Flake-Pulp Proportion, Percent | | Dielectric Strength, v.p.m. (Max.) | Tensile Strength, lb./in. Width | Tear Strength, Grams |
|---|---|---|---|---|
| Flake | Glassine | | | |
| 75 | 25 | 800 | 28.9 | 45 |
| 85 | 15 | 860 | 18.1 | 51 |
| 90 | 10 | 900 | 17.7 | 27 |
| 95 | 5 | 1,040 | 15.7 | 16 |

The flake construction produced according to this invention incorporates multidirectional properties as contrasted to uni- or bi-directional properties of woven fiber laminates. The strength weight-ratio is therefor improved. The flake composite is more economical in comparison to woven fiber laminates in that the cost of weaving is eliminated and the rate of production of such laminates is greater with flake than that with fibers. Hot spot temperatures of the composite can be more readily dispersed by use of glass flake insulation in such sheets because of their excellent thermoconductivity. In practice, overloads of the insulation which might otherwise destroy varnish or other coatings on the insulation, would usually not be sufficiently hot to melt the glass within the structures. The glass flake material offers not only a space factor, but because of their configuration they are highly effective as a di-electric barrier in their individual configurations. The glass flakes are completely inorganic, and since glassine has such a high adhesivity for the glass flake surfaces, the bonding can be effected with less than 5% of binding agent in the finished product.

In view of the foregoing, it will be seen that while we have described certain particular forms of our invention, it will be understood that we do not wish to be limited thereto since many modifications may be made within the concepts of the invention and we therefore, contemplate by the appended claims to cover all such modifications which fall within the true spirit and scope of our invention.

We claim:

1. An electrical insulation sheet comprising glass flakes compacted in intimate association in planar distribution and from 2 to 30 percent by weight of glassine pulp as the binding agent for the interfaces of adjacently disposed flakes.

2. An electrical insulation sheet comprising glass flakes and from 2 to 30 percent by weight of glassine pulp bonding said flakes together, said glassine pulp having been beaten to a degree of freeness corresponding to a reading greater than 600 seconds per 3 gram sample at 25° C. on a Williams precision freeness tester.

3. An electrical insulation sheet comprising glass flakes in the range of thickness of from .00003" to .0002" bonded together with from 2 to 30 percent by weight of glassine pulp as the bonding agent.

4. An electrical insulation sheet comprising glass flakes substantially .00008" thick bonded together with from 2 to 30% by weight of glassine pulp as the bonding agent.

5. An electrical insulation sheet comprising glass flakes in the range of from 70 to 98% flakes by weight bonded together with from 2 to 30 percent by weight of glassine pulp as the bonding agent.

6. An electrical insulation sheet comprising substantially 95% glass flakes and 5% glassine pulp as a binding agent therefor.

7. An electrical insulation sheet comprising glass flakes of random area dimension each of less than ½ square inch bonded and a thickness in the range of from .00003" to .0002" together with from 2 to 30 percent by weight of glassine pulp as the binding agent.

8. An electrical insulation sheet consisting of glass flakes bonded together with glassine pulp as the binding agent, the glass flakes comprising from 70 to 98 percent by weight of said sheet, said flakes being of random areas dimension and each flake being substantially .00008" thick, said glassine pulp upon mixture with said flakes having a degree of freensss corresponding to a reading greater than 600 seconds per 3 gram sample at 25° C. on a Williams precision freeness tester.

References Cited in the file of this patent

UNITED STATES PATENTS

| 1,868,566 | Grossman | July 26, 1932 |
| 2,457,785 | Slayter et al. | Dec. 28, 1948 |
| 2,504,744 | Sproull et al. | Apr. 18, 1950 |
| 2,704,105 | Robinson et al. | Mar. 15, 1955 |

OTHER REFERENCES

Fiberglas, "Fiberglas Products for Papermaking," Owens Corning Fiberglas Corp., February 1954, page 11 relied on.

Schulmeyer: "Glass Fibers in Papermaking," Paper Trade Journal, vol. 140, No. 40, Oct. 1, 1956, pages 26 and 27.